(12) United States Patent
Nasiri et al.

(10) Patent No.: US 9,046,937 B2
(45) Date of Patent: Jun. 2, 2015

(54) HIGH FIDELITY REMOTE CONTROLLER DEVICE FOR DIGITAL LIVING ROOM

(71) Applicant: InvenSense, Inc., Sunnyvale, CA (US)

(72) Inventors: Steve Nasiri, Saratoga, CA (US); Joseph Jiang, Sunnyvale, CA (US); Shang-Hung Lin, San Jose, CA (US); Yuan Zheng, Fremont, CA (US)

(73) Assignee: INVENSENSE, INC., San Jose, CA (US)

( * ) Notice: Subject to any disclaimer, the term of this patent is extended or adjusted under 35 U.S.C. 154(b) by 0 days.

(21) Appl. No.: 13/909,940

(22) Filed: Jun. 4, 2013

(65) Prior Publication Data

US 2013/0271372 A1    Oct. 17, 2013

Related U.S. Application Data

(63) Continuation of application No. 13/164,747, filed on Jun. 20, 2011, now Pat. No. 9,030,405.

(60) Provisional application No. 61/439,822, filed on Feb. 4, 2011.

(51) Int. Cl.
*G09G 5/00*     (2006.01)
*G06F 3/0346*   (2013.01)
*G06F 3/01*     (2006.01)
*G06F 3/038*    (2013.01)

(52) U.S. Cl.
CPC ............... *G06F 3/0346* (2013.01); *G06F 3/017* (2013.01); *G06F 3/0383* (2013.01)

(58) Field of Classification Search
CPC ..................................................... G06F 3/033

USPC .......... 345/156–160, 173–178; 715/700–703, 715/740
See application file for complete search history.

(56) References Cited

U.S. PATENT DOCUMENTS

| | | |
|---|---|---|
| 5,898,421 A | 4/1999 | Quinn |
| D528,510 S | 9/2006 | Schmieta et al. |
| 7,139,983 B2 | 11/2006 | Kelts |
| 7,158,118 B2 | 1/2007 | Liberty |
| 7,236,156 B2 | 6/2007 | Liberty et al. |
| 7,236,165 B2 | 6/2007 | Dautelle |
| D547,304 S | 7/2007 | Francz et al. |
| 7,239,301 B2 | 7/2007 | Liberty et al. |
| 7,260,789 B2 | 8/2007 | Hunleth et al. |
| 7,262,760 B2 | 8/2007 | Liberty |

(Continued)

OTHER PUBLICATIONS

International Search Report and Written Opinion, mailing date Jun. 6, 2012, for International application No. PCT/US12/23784, 12 pages.

*Primary Examiner* — Joseph Feild
*Assistant Examiner* — Gustavo Polo
(74) *Attorney, Agent, or Firm* — Sawyer Law Group, P.C.

(57) ABSTRACT

A device disclosed herein can include a six-axis motion sensor to accurately track three dimensional hand motions. For example, the sensors can include a three-axis accelerometer and a three-axis gyroscope. The remote control device can also include a processing unit integrated with the motion sensors in a single module. The processing unit can convert data regarding the hand motion to data regarding a cursor motion for a cursor that will be displayed on a screen of an electronic device. The processing unit can be integrated with the motion sensors in a single module (e.g. an integrated circuit chip (IC)).

22 Claims, 12 Drawing Sheets

(56) References Cited

U.S. PATENT DOCUMENTS

| | | |
|---|---|---|
| D550,214 S | 9/2007 | Francz et al. |
| D550,633 S | 9/2007 | Gupta |
| D551,660 S | 9/2007 | Francz et al. |
| D552,567 S | 10/2007 | Francz |
| 7,386,806 B2 | 6/2008 | Wroblewski |
| 7,414,611 B2 | 8/2008 | Liberty |
| 7,478,247 B2 | 1/2009 | Penzias |
| 7,484,184 B2 | 1/2009 | Wroblewski |
| D586,331 S | 2/2009 | Francz et al. |
| 7,489,298 B2 | 2/2009 | Liberty et al. |
| 7,489,299 B2 | 2/2009 | Liberty et al. |
| 7,493,341 B2 | 2/2009 | Israel et al. |
| D589,521 S | 3/2009 | Napier et al. |
| 7,535,456 B2 | 5/2009 | Liberty et al. |
| 7,634,793 B2 | 12/2009 | Hunleth et al. |
| 7,719,261 B2 | 5/2010 | Geck et al. |
| 2008/0158154 A1 | 7/2008 | Liberty et al. |
| 2008/0174550 A1 | 7/2008 | Laurila et al. |
| 2008/0300055 A1 | 12/2008 | Lutnick et al. |
| 2009/0071805 A1* | 3/2009 | Horning et al. ........ 200/61.45 R |
| 2009/0177323 A1 | 7/2009 | Ziegler et al. |
| 2009/0326851 A1 | 12/2009 | Tanenhaus |

* cited by examiner

HIGH FIDELITY REMOTE CONTROLLER DEVICE FOR DIGITAL LIVING ROOM

CROSS REFERENCE TO RELATED APPLICATIONS

The subject application is a continuation of U.S. patent application Ser. No. 13/164,747 filed Jun. 20, 2011 entitled "HIGH FIDELITY REMOTE CONTROLLER DEVICE FOR DIGITAL LIVING ROOM" which claims priority to U.S. Provisional Patent Application Ser. No. 61/439,822 filed Feb. 4, 2011 entitled "NOVEL REMOTE CONTROLLERS WITH MOTION SENSORS FOR CONTROLLING AND NAVIGATING TELEVISION SETS AND 3D COMPUTER USER INTERFACES, AND NOVEL PICO PROJECTORS AND USER AUTHENTICATION DEVICES WITH MOTION SENSORS" the entireties of each are incorporated by reference herein.

TECHNICAL FIELD

Described herein is a remote controller device that can employ motion sensors to facilitate mode switching functions to accommodate different types of hand motions.

BACKGROUND

A remote controller device can be utilized to detect hand motion and correspond to the detected hand motion to motion of a cursor on a screen. When a user tries to point the remote controller device at the screen, for example to select a small icon or link, the remote controller device can detect the intended pointing motion, but can also detect unintended hand jitter. In the case of pointing, the hand jitter can be of the same magnitude of the intended hand motion, and the remote controller device can have trouble distinguishing the intended motion from the hand jitter.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

Described herein are systems, methods and apparatuses for a remote controlling device. The remote controlling device can include at least two motion sensors that can detect a hand motion. For example, the sensors can include a three-axis accelerometer and a three-axis gyroscope to accurately trace three dimensional motions. The remote control device can also include a processing unit that can convert data regarding the hand motion to data regarding a cursor motion. The processing unit can be integrated with the motion sensors in a single module. The processing unit can include at least two modes of functionality corresponding to different types of hand motion: a one to one mode where the cursor directly tracks the hand motion and a non-linear mode that filters data from the motion sensors to eliminate hand jitter. The remote controlling device can also include a radio frequency (RF) that can transmit the data regarding the cursor movement to an electronic device (e.g., a television screen).

The following description and annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Various non-limiting embodiments of a remote control device and methods utilized with the remote control device are described herein. In the following description, numerous specific details are set forth in order to provide a thorough understanding of one or more embodiments. One skilled in the relevant art will recognize, however, that the techniques described herein can be practiced without one or more of the specific details, or with other methods, components, materials, etc., and is not limited by these specific details and examples. In other instances, well-known structures, materials, and/or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

The word "exemplary" is used herein to mean serving as an example, instance, or illustration. For the avoidance of doubt, the subject matter disclosed herein is not limited by such examples. Any aspect described herein as "exemplary" is not necessarily to be construed as preferred or advantageous over other, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 1:
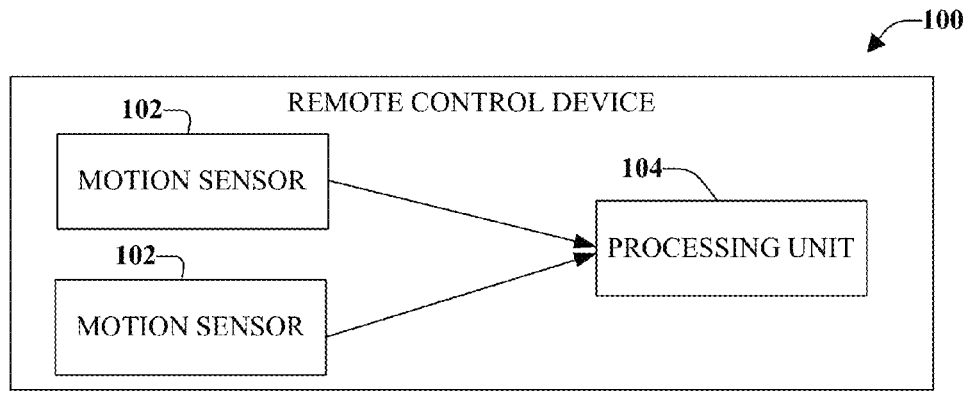
FIG. 1 is a schematic system block diagram of an embodiment of a remote control device.

Referring now to FIG. 1, illustrated is a schematic system block diagram of a remote control device 100. The remote control device 100 can, for example, be utilized in connection with a television, computer, or the like. The remote control device 100 can be utilized to control any electronic device with a display. The remote control device 100 can have any number of buttons. For example, the remote control device 100 can be free of buttons or have one, two, three, etc. buttons. In one embodiment, the remote control device 100 can have a single button. The single button can be utilized to both turn an associated device on and, once the associated device is on, to indicate gestures. For example, the button can be pressed and the remote control can sense that the user is intending to make a gesture.

Remote control device 100 can sense hand motions and convert the hand motions to signals understood by an electronic device. For example, the hand motions can translate to cursor movements on a screen of an electronic device. To sense the hand motions, the remote control device can include motion sensors 102. Although two motion sensors are illustrated here, it will be understood that any number of motion sensors can be utilized to detect hand motion. According to an embodiment, the motion sensors 102 can include a gyroscope. According to another embodiment, the motion sensors 102 can include an accelerometer. According to a further embodiment, the motion sensors 102 can include a gyroscope and an accelerometer. According to a further embodiment, the motion sensors 102 can include a compass. According to another embodiment, the motion sensors 102 can include six axes. In one aspect, the motion sensors 102 can be embodied on a single integrated circuit (IC) chip.

The motion sensors 102 can detect hand motion, including, for example, gestures made while holding the remote control device 100. Examples of gestures the motion sensors 102 can detect include, but are not limited to, a tap, a shake, a hand written letter, character and/or symbol, etc. According to an embodiment, the motion sensors 102 can detect a gesture, and the gesture can be utilized in switching motion capture modes for the remote control device 100.

Remote control device 100 can have multiple modes of motion functionality. According to an embodiment, the remote control device 100 can operate in a linear mode. The linear mode can be a one to one motion tracking mode in which the hand motion is accurately captured. The linear mode can be useful, for example, for Asian character input, drawing, handwriting recognition, and the like.

According to another embodiment, the remote control device 100 can operate in a pointing mode. The pointing mode can be a non-linear mode. In the pointing mode, any hand motion, including undesirable jitter can be detected. For example, jitter can be due to hand jitter, button pushing, and the like. In the pointing mode, the hand motion can be filtered to reduce effects caused by jitter. The pointing mode can be useful, for example, for selecting links on Web pages, clicking icons in a document, or the like.

The modes can be implemented by a processing unit 104, which can be coupled to the motion sensors 102. The processing unit 104 can receive data from the motion sensors 102 indicating a hand motion was detected. Upon receiving the data, the processing unit 104 can convert the data from the motion sensor into data corresponding to the display of an electronic device. For example, the processing unit 104 can process three-dimensional data from the motion sensors 102 regarding the hand motion into two dimensional data able to be displayed on an electronic device display. For example, the processing unit 104 can convert the data from the motion sensors 102 indicating a hand motion into data indicating an on-screen cursor movement, for example, for a television screen or computer monitor.

According to an embodiment, the motion sensors 102 can be embodied in a single module and the processing unit 104 can be embodied in another module. According to another embodiment, both the motion sensors 102 and the processing unit 104 can be embodied in a single module. In a further embodiment, the motion sensors 102 can be embodied in a single module and the processing unit 104 and a radio frequency (RF) unit (described below) can be embodied on another module. According to another embodiment, the processing unit 104 can be split across two modules, with a first part of the processing unit embodied on a single module with the motion sensors 102 and the second part of the processing unit embodied on another module with the RF unit (described below). In a further embodiment, the motion sensors 102, the processing unit 104 and the RF unit (described below) can be embodied on a single module.

Figure 2:
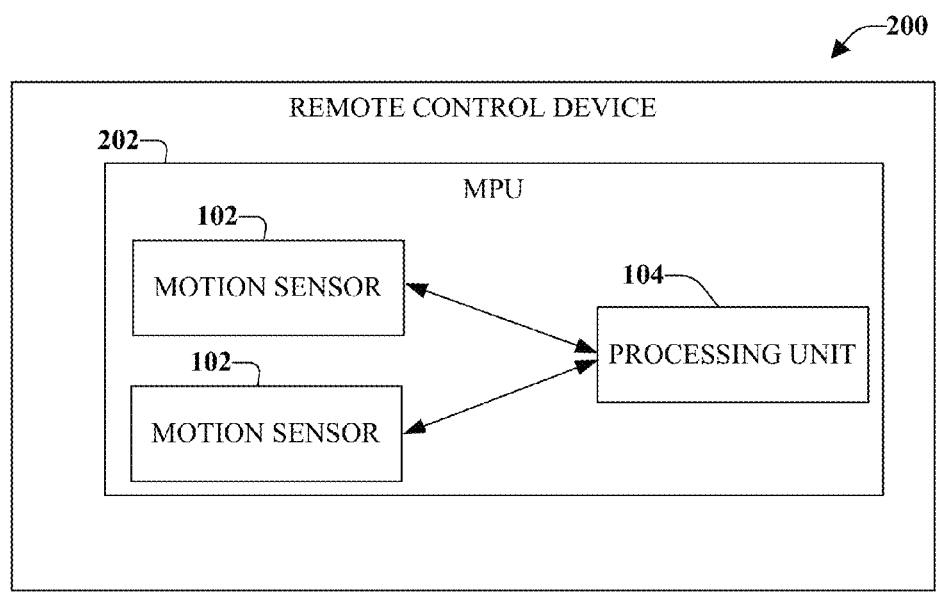
FIG. 2 is a schematic system block diagram of an embodiment of a remote control device.

Referring now to FIG. 2, illustrated is a schematic system block diagram of a remote control device 200. The remote control device 200 can, for example, be utilized in connection with a television, computer, or the like. The remote control device 200 can be utilized to control any electronic device with a display. The remote control device 200 can have any number of buttons. For example, the remote control device 200 can be free of buttons or have one, two, three, etc. buttons.

Remote control device 200 can include motion sensors 102 coupled to a processing unit 104 to detect hand motions and convert data related to the hand motions to data useable by a electronic device, for example a television or a computer. The remote control device 200 includes a motion processing unit (MPU) 202 that can integrate the motion sensors 102 with the processing unit 104. According to an embodiment, the MPU 202 can be situated on a single integrated circuit (IC), so that the motion sensors 102 and the processing unit 104 are embodied on a single IC chip.

Although two motion sensors 102 are illustrated as part of the MPU, it will be understood that any number of motion sensors can be utilized to detect hand motion. According to an embodiment, the motion sensors 102 can include a gyroscope. According to another embodiment, the motion sensors 102 can include an accelerometer. According to an embodiment, the motion sensors 102 can include an accelerometer. According to another embodiment, the motion sensors 102 can include a compass. According to a further embodiment, the motion sensors 102 can include a gyroscope and an accelerometer. According to another embodiment, the motion sensors 102 can include six axes.

The motion sensors 102 can detect hand motion, including, for example, gestures made while holding the remote control device 100. Examples of gestures the motion sensors 102 can detect include, but are not limited to, a tap, a shake, a hand written letter, character and/or symbol, etc. According to an embodiment, the motion sensors 102 can detect a gesture, and the gesture can be utilized in switching motion capture modes for the remote control device 200.

Remote control device 200 can have multiple modes of motion functionality. According to an embodiment, the remote control device 200 can operate in a linear mode. The linear mode can be a one to one motion tracking mode in which the hand motion is accurately captured. The linear mode can be useful, for example, for Asian character input, drawing, handwriting recognition, and the like.

According to another embodiment, the remote control device 200 can operate in a pointing mode. The pointing mode can be a non-linear mode. In the pointing mode, any hand motion, including undesirable jitter can be detected. For example, jitter can be due to hand jitter, button pushing, and the like. In the pointing mode, the hand motion can be filtered to reduce effects caused by jitter. The pointing mode can be useful, for example, for selecting links on Web pages, clicking icons in a document, or the like.

A processing unit 104 can implement the mode for the remote control device 200. The motion sensors 102 can be coupled to the processing unit 104 so that the processing unit 104 can receive data from the motion sensors 102 indicating a hand motion was detected. Upon receiving the data, the processing unit 104 can convert the data from the motion sensor into data corresponding to the display of an electronic device. For example, the processing unit 104 can process three-dimensional data from the motion sensors 102 regarding the hand motion into two dimensional data able to be displayed on an electronic device display. For example, the processing unit 104 can convert the data from the motion sensors 102 indicating a hand motion into data indicating an on-screen cursor movement, for example, for a television screen or computer monitor.

Figure 3:
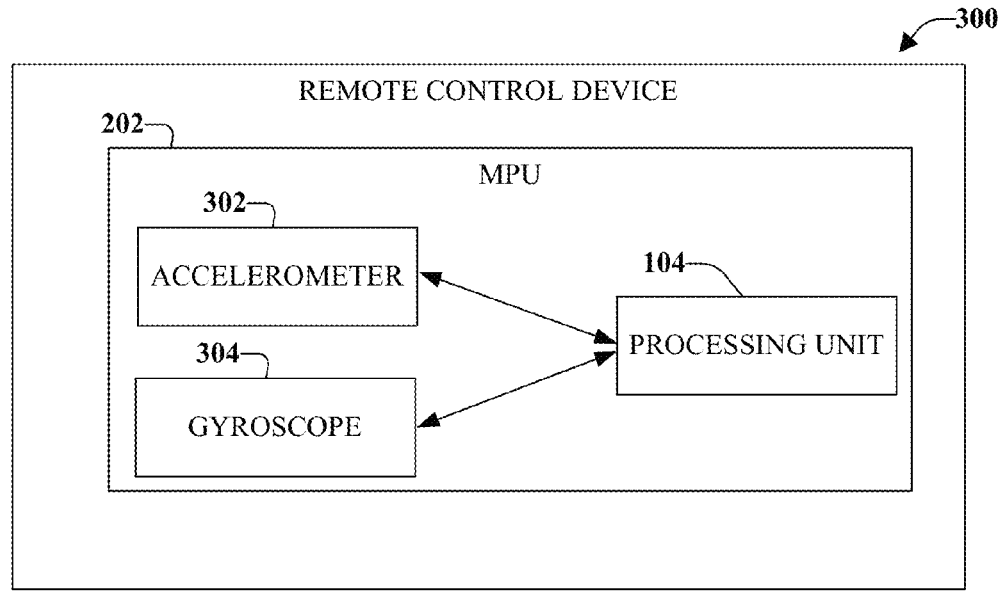
FIG. 3 is a schematic system block diagram of an embodiment of a remote control device.

Referring now to FIG. 3, illustrated is a schematic system block diagram of a remote control device 300. The remote control device 300 can, for example, be utilized in connection with a television, computer, or the like. The remote control device 300 can be utilized to control any electronic device with a display. The remote control device 300 can have any number of buttons. For example, the remote control device 300 can be free of buttons or have one, two, three, etc. buttons.

Remote control device 300 can include a motion processing unit (MPU) 202 that can integrate motion sensors, including one or more accelerometers 302 and one or more gyroscopes 304, and a processing unit 104. The MPU can also include a compass (not illustrated). The MPU 202 can be a single module that can detect hand motions and process the hand motions into data usable by an electronic device (e.g., a cursor on a television screen). According to an embodiment, the MPU 202 can be situated on a single integrated circuit (IC), so that the accelerometer 302, gyroscope 304 and the processing unit 104 are embodied on a single IC chip.

According to an embodiment, the accelerometer 302 and the gyroscope 304 can have six axes. For example, accelerometer 302 can be a three axis accelerometer and gyroscope 304 can be a three axis gyroscope. Utilizing the six axes, the MPU 202 can calculate a three dimensional (3D) orientation corresponding to a hand motion with a high accuracy.

For example, a person can make a hand motion with the remote control. The hand motion can be a tap, a shake, a hand written letter, character, and/or a symbol, or the like. The accelerometer 302 and gyroscope 304 can detect the hand motion. For example, accelerometer 302 can detect acceleration of the remote control device and the gyroscope 304 can detect orientation of the remote control device. A three axis accelerometer 302 can detect acceleration in 3D, while a three axis gyroscope can detect orientation in 3D. The processing unit 104 can take 3D data from the accelerometer 302 and the gyroscope 304 corresponding to the hand motion and convert the 3D data to 2D data, for example, corresponding to a cursor movement on a screen (e.g., a television screen or a computer monitor).

According to another embodiment, the hand motion can be utilized to switch motion capture modes in the remote control device 300. Remote control device 300 can have multiple modes of motion functionality. According to an embodiment, the remote control device 300 can operate in a linear mode. The linear mode can be a one to one motion tracking mode in which the hand motion is accurately captured. The linear mode can be useful, for example, for Asian character input, drawing, handwriting recognition, and the like.

According to another embodiment, the remote control device 300 can operate in a pointing mode. The pointing mode can be a non-linear mode. In the pointing mode, any hand motion, including undesirable jitter can be detected. For example, jitter can be due to hand jitter, button pushing, and the like. In the pointing mode, the hand motion can be filtered to reduce effects caused by jitter. The pointing mode can be useful, for example, for selecting links on Web pages, clicking icons in a document, or the like.

Figure 4:
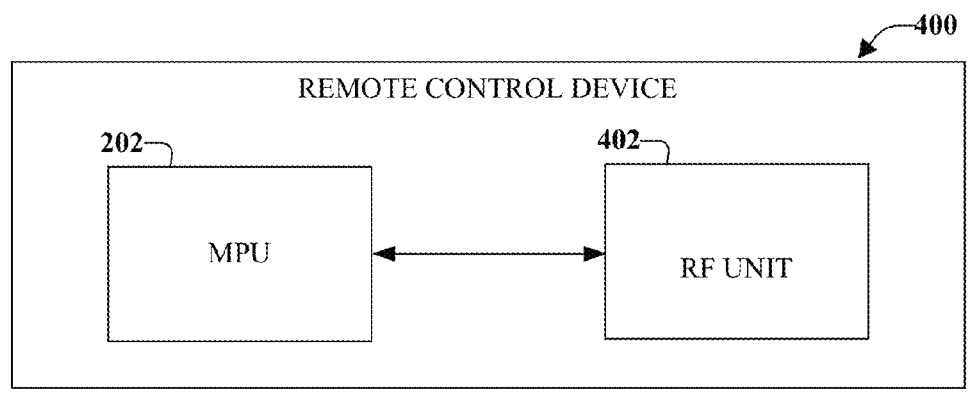
FIG. 4 is a schematic system block diagram of an embodiment of a remote control device.

Referring now to FIG. 4, illustrated is a schematic system block diagram of a remote control device 400. The remote control device 400 can, for example, be utilized in connection with a television, computer, or the like. The remote control device 400 can be utilized to control any electronic device with a display. The remote control device 400 can have any number of buttons. For example, the remote control device 400 can be free of buttons or have one, two, three, etc. buttons.

Remote control device 400 can include a motion control unit 202. For example, the motion control unit 202 can include motion sensors and a processing unit. The motion sensors can include an accelerometer, a gyroscope, and/or a compass. According to an embodiment, the accelerometer can be a three axis accelerometer and the gyroscope can be a three axis gyroscope. The motion control unit 202 can be a module incorporating motion sensors 102 and a processing unit 104.

The MPU can detect a hand motion through the motion sensors. Data from the motion sensors can be sent to the processing unit, and can be transformed into data usable by an electronic device, like a television screen, a computer monitor, or the like, by the processing unit. The processing unit can, for example, transform three dimensional (3D) data from the motion sensors indicating a hand motion into two dimensional (2D) data for use by the electronic device, such as a cursor motion on a screen.

The remote control device 400 can also include a radio frequency (RF) unit 402 coupled to the MPU 202. The RF unit 402 can receive the 2D data for use by the electronic device, such as the cursor motion on the screen from the MPU 202. The RF unit 402 can transmit the 2D data for use by the electronic device via a wireless protocol. Although not shown, the electronic device can be a television, a computer, or any electronic device with a screen or other user interface. The wireless protocol can include WiFi™, Bluetooth™, Radio Frequency for Consumer Electronics (RF4CE), and the like.

According to an embodiment, the MPU and the RF unit can be situated on the same integrated circuit (IC) chip. According to another embodiment, the MPU and the RF unit can be situated on different IC chips.

Remote control units 100-400 as illustrated in FIG. 1-4 can operate under multiple modes of motion functionality. For example, processing unit 104 can operate differently under the multiple modes. In a traditional computing environment, there are two different requirements for a remote control device: detection of large motions and detection of small motions. Remote control devices 100-400 can employ a linear mode for detection of large motions and a pointing mode for detection of small motions.

The linear mode can be utilized for detection of large motions. The linear mode can be a one to one motion tracking mode. The linear mode can be utilized, for example, for Asian characters, drawing, handwriting, or the like. In the linear mode, the overall motion is greater than any extraneous motion, such as hand jitter. For example, when the hand motion is a handwritten letter, the overall motion of the entire letter is greater than any unintended hand jitter. Therefore, the motion can still be tracked without being affected by extraneous motions like hand jitter. The linear motion can still accurately reconstruct the hand motion.

On the other hand, hand jitter and other extraneous motions can affect motions in the pointing mode. The pointing mode can detect any hand motion, including the intended hand motion and accompanying jitter. In the pointing mode, the hand motion is a small motion, such as selecting links on a Web page, clicking icons in a document, and the like. The hand jitter can be of approximately the same order as the hand motion, so, unlike the linear mode, the pointing mode cannot match the hand motion one to one to the intended action. Accordingly, the pointing mode is a non linear mode. In the pointing mode, hand motions can be filtered to reduce the extraneous effects, for example, caused by unwanted motions or disturbances, such as hand jitter, button pushing, or the like.

For example, in the pointing mode, a user can point the remote control device 100-400 to select small icons or to navigate between small icons, for example with regard to a Web browser or a menu tree system. Since some users have a significant hand jitter, the remote control device 100-400 can interpret user intention and help to track the target icon in spite of the significant hand jitter.

According to an aspect, a user of the remote control device 100-400 is able to switch between modes (e.g., the linear mode and the pointing mode) at will. The remote control device can switch between modes, for example, by detecting a user pressing a button, by detecting a certain gesture, such as tap, a shake, a handwriting symbol, or a character, or by utilizing content to decide upon the mode without user intervention.

Figure 5:
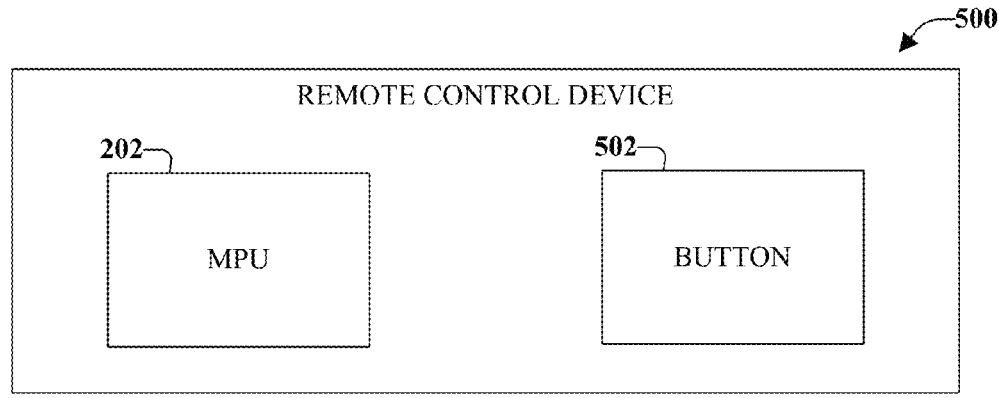
FIG. 5 is a schematic system block diagram of an embodiment of a remote control device.

Referring now to FIG. 5 illustrated is a schematic system block diagram of a remote control device 500 that can include a button 502 for indicating a mode switch. The remote control device 500 can switch between modes by detecting a user pressing a button 502. For example, a user can activate button 502 to indicate to the MPU 202 to switch modes. Although a "button" is described here, it should be understood that any other mechanism that a user can signal is within the scope of a "button." According to an aspect, the MPU 202 can indicate different modes by utilizing different cursor shapes corresponding to the different modes. Based on the shape of the cursor, a user can identify the mode of remote control device 500.

Figure 6:
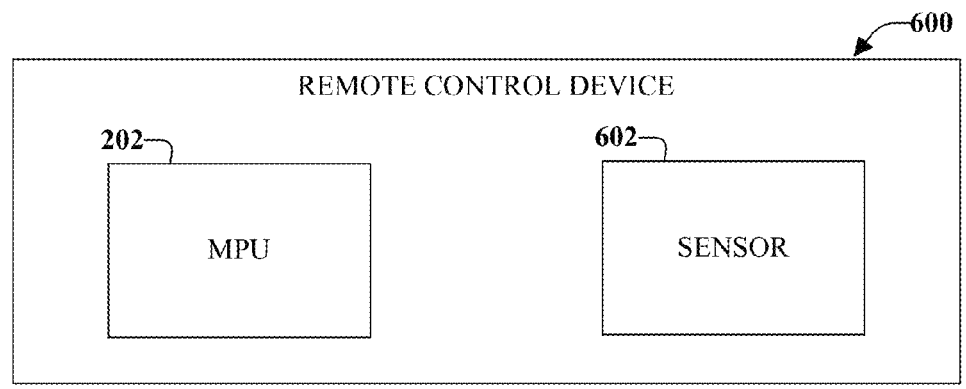
FIG. 6 is a schematic system block diagram of an embodiment of a remote control device.

Referring now to FIG. 6, illustrated is a schematic system block diagram of a remote control device 600 employing a different mechanism for allowing a user to switch modes at will. Remote control device 600 can employ a gesture based mode switching. For example, the sensor 602 (or the MPU 202) can detect a motion that indicates a mode switch. The gesture can include one or more of as tap, a shake, a handwriting symbol, or a character. According to an embodiment, sensor 602 can be one or more motion sensors that are part of the MPU 202.

For example, the motion can be a shaking motion. The shaking motion can be at a predefined altitude. This gesture can replace the need for activating a button to indicate a mode switch. According to an embodiment, remote controller device 600 can be programmed with a specific gesture indicating a mode switch. For example, the mode switch can be triggered when a user vertically flips the remote controller device 600, for example, to point up to the sky or down to the ground, then shakes the remote controller device 600 a certain number of times (e.g., three times). The MPU 202 can indicate different modes by utilizing different cursor shapes corresponding to the different modes. Based on the shape of the cursor, a user can identify the mode of remote control device 600.

Figure 7:
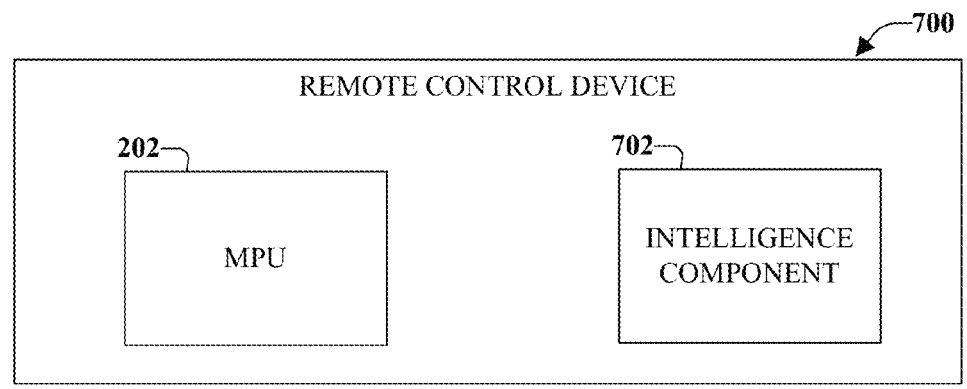
FIG. 7 is a schematic system block diagram of an embodiment of a remote control device.

Referring now to FIG. 7, illustrated is a schematic system block diagram of a remote control device 700 employing a different mechanism for allowing a user to switch modes at will. Remote control device 700 can employ a content based mode switch, illustrated as intelligence component 702. The intelligence component 702 can include system software that, when executed by a processor, can make the mode switch decision and execute the mode switch without user intervention.

For example, intelligence component 702 can detect when a cursor is on top of an application that necessitates a specific mode. For example, the intelligence component 702 can detect that the cursor is on top of a Web browser and determine that the Web browser requires the remote controller device 700 to be in the pointing mode. The intelligence component 702 can detect that the Web browser includes small icons that necessitate the high precision pointing mode. The intelligence component 702 can indicate to the MPU 202 to change the mode to the pointing mode and change the cursor to a style corresponding to the pointing mode. When the cursor is on top of a different application, for example a television pop up, a video pop up, or the like, the intelligence component 702 can detect that the different application does not require the high precision pointing mode and can initiate a switch to the linear mode.

The remote controllers as described in FIGS. 1-6 can operate in multiple modes. For example, these modes can include a linear mode and a pointing mode. The linear mode can be a one to one motion tracking mode. The linear mode can be useful, for example, for Asian character input, drawing, handwriting recognition, and the like. The pointing mode can be a non-linear mode that can remove undesirable hand jitter from the hand motion, for example, by filtering the hand motion to reduce effects caused by jitter. The pointing mode can be useful, for example, for selecting links on Web pages, clicking icons in a document, or the like.

Figure 8:
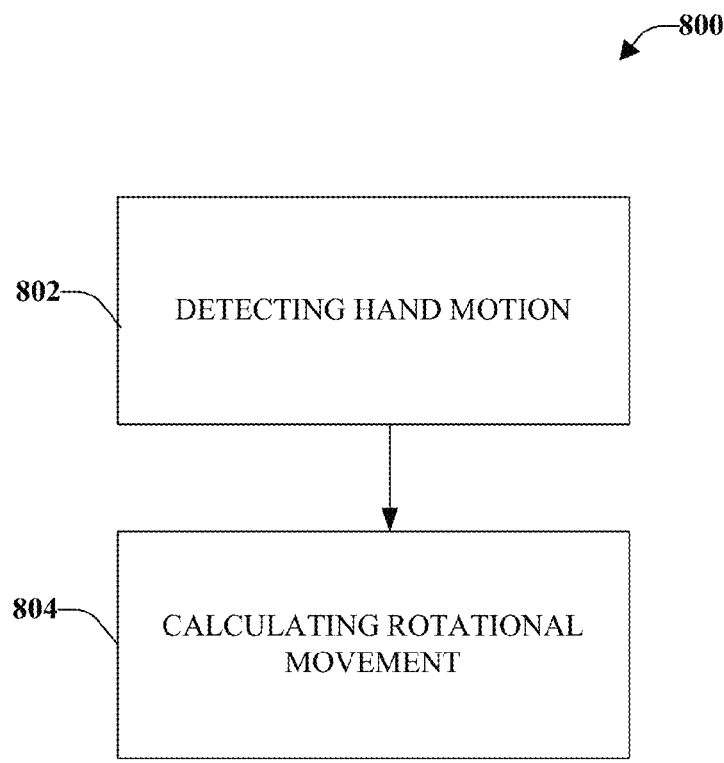
FIG. 8 is a process flow diagram of a method for motion processing in linear mode.

Referring now to FIG. 8, illustrated is a process flow diagram for a method 800 of motion processing employing the linear mode. In method 800 and other following methodologies, the methodologies are illustrated as schematic process flow diagrams. While, for purposes of simplicity of explanation, the methodologies are shown and described as a series of acts, it is to be understood and appreciated that the order of acts is not limiting, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method.

The motion processing begins at element 802, where sensors (e.g., motion sensors in a remote control device) sense a hand motion. The sensors can include an accelerometer, a gyroscope and/or a compass. The accelerometer can be a three axis accelerometer. The gyroscope can be a three axis gyroscope. The hand motions detected by the motion sensors can include, but are not limited to a drawing, a hand written letter, character and/or symbol, etc.

Data regarding the hand motion sensed by the motion sensors can be transmitted to a processing unit, and, at element 804, a rotational movement is calculated from the data regarding the hand motion. The rotational movement can be transformed into cursor location coordinates (e.g. three dimensional (3D) coordinates). For example, the rotational movement can be transformed into 3D Euler angles.

According to an embodiment, the hand rotational movement can be represented by the quaternion of 3D rotation. The corresponding cursor location coordinates can be linearly mapped to a two dimensional (2D) position. For example, the cursor location coordinates represented by the quaternion of 3D rotation can be Yaw and Pitch Euler angles, which can be linearly mapped to a 2D position. The 2D position can be related to a position of a cursor that will be displayed on a screen of an electronic device like a television, a computer screen, or the like. For example, hand rotation movement on the yaw axis can be mapped to the X-axis on a 2D screen and hand rotation movement on the pitch axis can be mapped to the Y-axis on the 2D screen.

High fidelity one to one motion tracking can be achieved by tracking the cursor location coordinates (e.g., Euler angles), corresponding to true motion of a user's hand, with an internal cursor image. Any difference between the true motion and the internal cursor angles will be utilized to calculate a digitized delta (e.g., mouse data format). The remaining value can be accumulated in the internal cursor image so that there is no long term drift due to the quantization error.

In the linear mode, although hand jitter is detected with the hand motion, hand jitter is small compared to the cursor moving to indicate hand motion. Therefore, hand jitter can be ignored in the processing.

Figure 9:
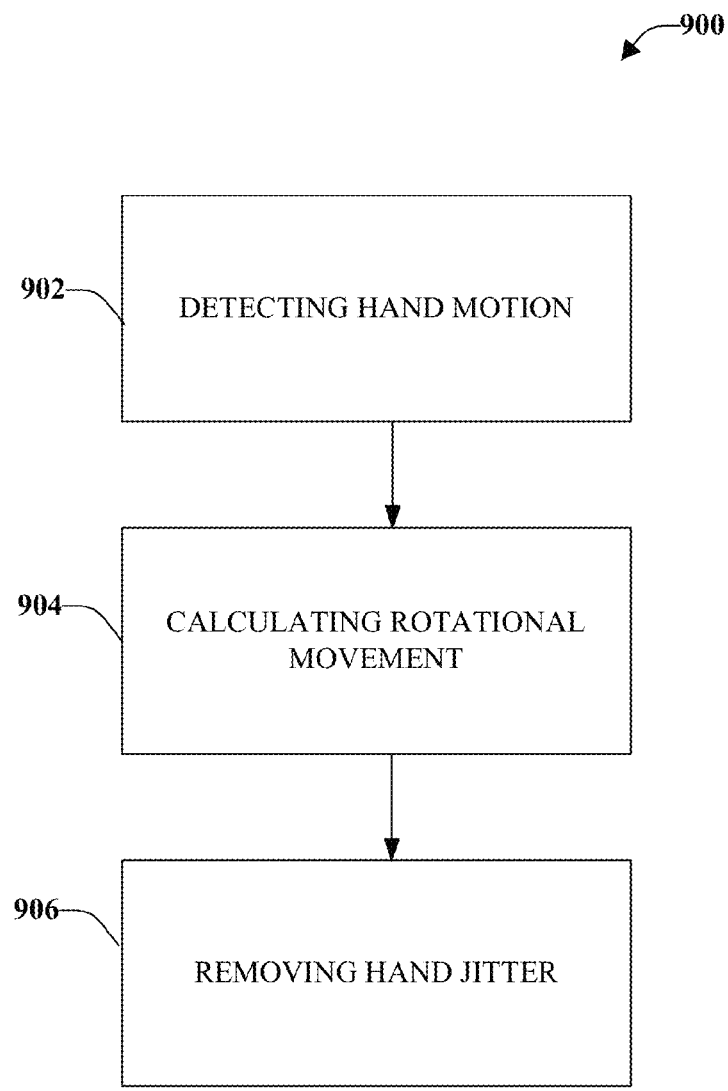
FIG. 9 is a process flow diagram of a method for motion processing in pointing mode.

In contrast, in the pointing mode, hand jitter is not small compared to the hand motion. Accordingly, the hand jitter can be filtered from the hand motion and removed. FIG. 9 illustrates a process flow diagram for a method 900 of motion processing employing the pointing mode.

The method 900 begins in the same way as method 800 of FIG. 8. The motion processing begins at element 902, where sensors (e.g., motion sensors in a remote control device) sense a hand motion. The sensors can include an accelerometer and a gyroscope. The accelerometer can be a three axis accelerometer. The gyroscope can be a three axis gyroscope. The hand motions detected by the motion sensors can include, but are not limited to a tap, a shake, etc.

Data regarding the hand motion sensed by the motion sensors can be transmitted to a processing unit, and, at element 804, a rotational movement is calculated from the data regarding the hand motion. The rotational movement can be transformed into cursor location coordinates (e.g., 3D Euler angles).

According to an embodiment, the hand rotational movement can be represented by the quaternion of 3D rotation. The corresponding cursor location coordinates can be linearly mapped to a two dimensional (2D) position. For example, the 2D position can be related to a position of a cursor that will be displayed on a screen of an electronic device like a television, a computer screen, or the like. For example, hand rotation movement on the yaw axis can be mapped to the X-axis on a 2D screen and hand rotation movement on the pitch axis can be mapped to the Y-axis on the 2D screen.

High fidelity one to one motion tracking can be achieved by tracking the cursor location coordinates, corresponding to true motion of a user's hand, with an internal cursor image. Any difference between the true motion and the internal cursor angles will be utilized to calculate a digitized delta (e.g., mouse data format). The remaining value can be accumulated in the internal cursor image so that there is no long term drift due to the quantization error.

The motion sensors can detect any motions from a user's hand. When the user, for example, an elderly person or a young child, holds the remote controlling device the hand jitters, or makes a motion different than the intended motion. Accordingly, the hand jitter, or other uncertainties, can show up in the sensed signals. If the user moves the remote controller device faster than the hand jitter, as is the case for the linear mode, the uncertainties from hand jitter do not negatively influence detection of the hand motion and/or user intention associated with the hand motion. However, as in the case of the pointing mode, if the user points at a small object (e.g., an icon or a link) with the remote controlling device, the effect of hand jitter will be apparent.

At element 906, hand jitter can be removed from the sensed hand motion. A user intention can be identified when the user points to one target, even with strong hand jitter. However, when the user intends to make a fine adjustment of the pointing, with the size of the hand jitter, uncertainties with magnitudes similar to the magnitude of the fine adjustment make separating a user intended hand gesture from the hand jitter.

According to an aspect, the motion sensor can detect both hand motion and jitter. Rotational movement corresponding to the hand motion can be calculated and transformed into the cursor location coordinates while the hand jitter is removed. Accordingly, only the hand motion will not be shown as the cursor movement on the screen and the cursor movement will not be affected by the hand jitter. For example, a nonlinear quadratic function can be utilized to reduce and/or eliminate the hand jitter. According to an embodiment, an intelligent state machine can be employed to remove the hand jitter.

In removing hand jitter, a basic assumption about the frequency hand jitter can be made. For example, the frequency of hand jitter can be assumed to be around 5 to around 10 hertz (Hz). Accordingly, if a 200 Hz sampling rate is utilized for a motion sensor signal processing modules, a full cycle of hand jitter can take around 20 to around 40 samples.

In addition to hand jitter, button pushing can cause artifacts that can be removed in a method similar to the removal of hand jitter. For example, the remote controller device can include one or more buttons. When a user pushes the buttons, some unwanted hand motion can be included. This unwanted hand motion can disturb the cursor on the screen. According to an embodiment, the intelligent state machine can be employed to remove these unwanted motions.

For example, hand jitter and/or button push motion can be detected in the intelligence of the state machine. The true hand motion can be tracked and the one to one cursor movement according to the hand motion can be achieved.

Figure 10:
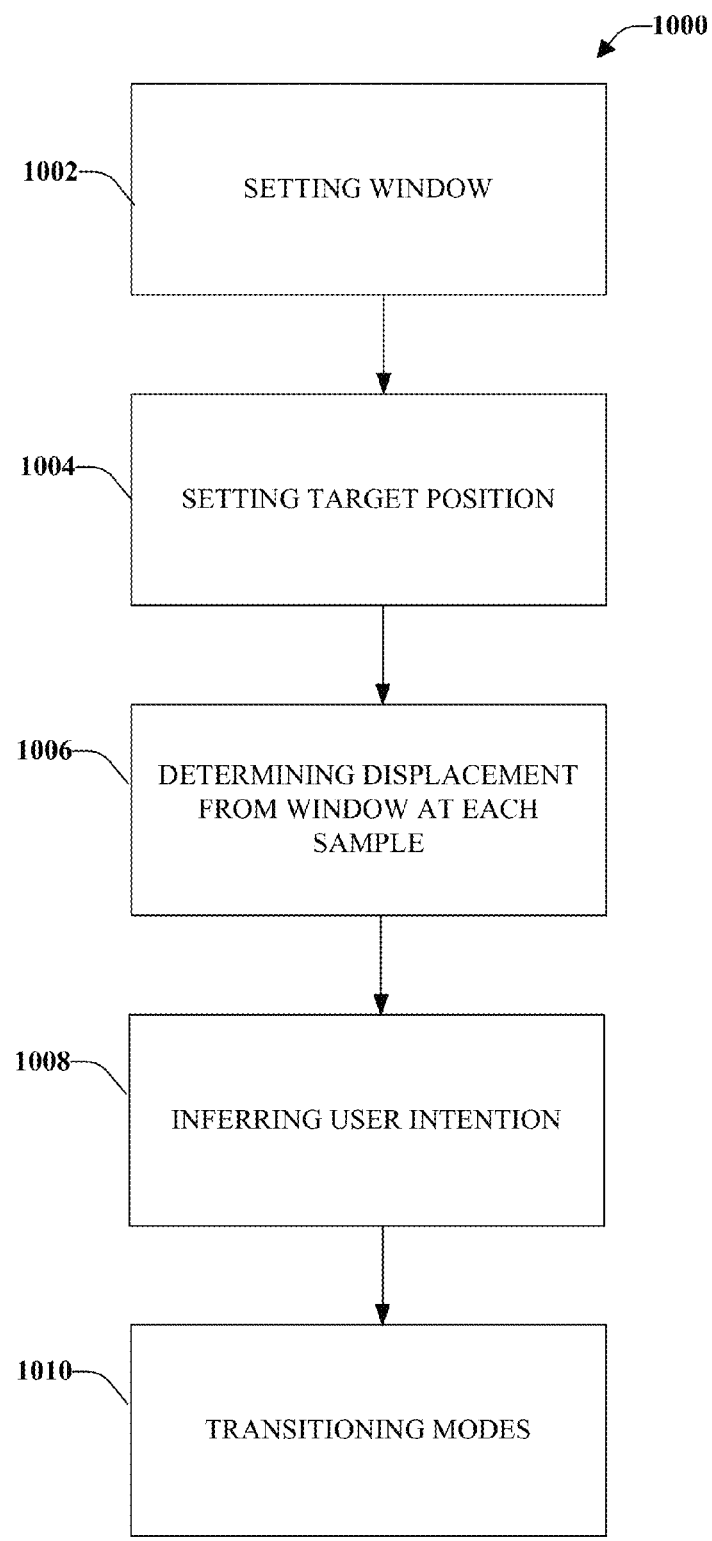
FIG. 10 is a process flow diagram of a method for intelligently transitioning between motion processing modes in a remote controller device.

The state machine can remove hand jitter and/or button pushing artifacts and can also intelligently detect when a user intends to transition between modes. According to an embodiment, as illustrated in FIG. 10, the state machine can employ a method 1000 to intelligently transition modes in a remote controller device. For example, the state machine can transition from a pointing mode to a linear mode (e.g., a moving mode or a drawing mode). The state machine can also transition from a linear mode to a pointing mode.

The method 1000 begins at element 1002 where a hand jitter window is created. In removing hand jitter, a basic assumption about the frequency hand jitter can be made. For example, the frequency of hand jitter can be assumed to be around 5 to around 10 hertz (Hz). Accordingly, if a 200 Hz sampling rate is utilized for a motion sensor signal processing modules, a full cycle of hand jitter can take around 20 to around 40 samples. Based on this assumption, a hand jitter window is created in which the maximum and minimum of delta, a current sample minus a previous sample, can be calculated in real time. For example, the window can be a 40 sample window. Logic for the window is simple to implement in software and can be executed by a hardware processor.

For example, for a remote controller device utilized with a television, the window can be a rectangular box. The two dimensional signals, e.g. yaw angle and pitch angle, can be utilized with the rectangular box. A 2D max and min with a predefined margin can define the size of the hand jitter window. The size of the hand jitter window can be user dependent. Additionally or alternatively, the size of the hand jitter can be adjusted in real time during the pointing mode.

During the pointing mode, the cursor is frozen even though the sensors can detect a movement. This detected movement can be an intended gesture or merely hand jitter or another artifact. The intelligent state machine can determine whether the detected movement is an intended gesture or merely hand jitter or another artifact.

At element 1004, a target position is recorded for the current pointing mode. For example, this can be a position where the cursor is frozen in the pointing mode. At element 1006, at each sample, a displacement of the current sensed movement from the target position is calculated. At element 1008, a user intention is determined. For example, if the displacement is consistently larger than the boundary of the window in more than a certain number of samples (e.g., 20 samples) in one direction, a user intention of leaving the target point is determined. At element 1010, a mode can be transitioned (e.g., from the pointing mode to the linear mode—either a moving mode or a drawing mode).

During the point mode, the cursor is frozen, even though the motion sensors can record a motion. In contrast, during the linear mode (e.g., drawing mode or moving mode), the cursor will follow the hand motion. In method 1000, the latency from the state transition from pointing mode to linear mode is a maximum of 20 samples or 100 milliseconds.

The state machine with hysteresis can be utilized to smooth the transition between the pointing mode and the linear mode (e.g., moving mode or drawing mode). Additionally, the state machine can also handle button click and/or double click intelligently.

Figure 11:
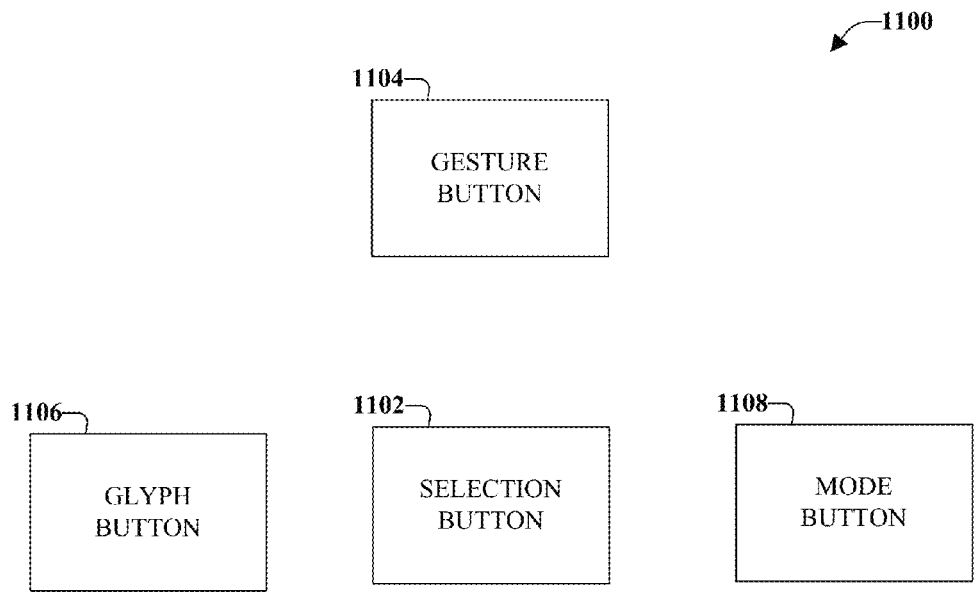
FIG. 11 is a schematic system block diagram of button assignments for a state machine.

As illustrated in FIG. 11, the state machine 1000 can be associated with buttons having different functionalities. FIG. 11 shows an exemplary embodiment of buttons that can be utilized for a mouse cursor display state machine. For example, a Selection Button 1102 can select the target icon. The Gesture Button 1104 can be utilized to trigger gesture actions. For example, a gesture action can include a yaw gesture to change a Web page, a pitch gesture to scroll down a long Web page, and a roll gesture to change a system speaker volume. The Glyph Button 1106 can trigger a glyph engine, which will display a trace of the glyph on a screen and, at the same time, decode the glyph trace with the Glyph Button 1106 is released. The Mode Button 1108 can toggle between the two different modes. For example, the two different modes can include the linear mode and the pointing mode. In the linear (one to one) mode, the user hand motion can be translated into cursor movement with high fidelity. In the pointing mode, the user's hand jitter is strongly rejected so that it is easy for users to point to small icons, even if the user's hand has a strong jitter.

For example, the two different operating modes (e.g., the linear mode and the pointing mode) are suitable for different application. For example, the pointing mode can be utilized in applications that need to handle small icons. Additionally, for example, the linear mode can be used in drawing and/or glyph applications that do not need to handle small icons.

Although illustrated in FIG. 11 is a remote control that is associated with four buttons, a remote control utilizing the state machine can have any number of buttons. For example, the remote control can have three buttons—e.g., gesture, glyph and select—with an automatic context-aware mode switch algorithm. In another example, the remote control can have two buttons—e.g., gesture/glyph and select—where the gesture recognition can also recognize glyph. The remote control can also be a one button remote control, where a quick button press can be treated as select, and a longer button press (e.g., press and hold) can be treated as gesture/glyph.

In the example of the one button remote control, the button on the device can have two purposes: when the electronic device is off, a button press will turn the electronic device on. When electronic device is on, pressing and holding the button will allow the user to enter gesture commands, and the remote control can capture the user's hand movement (e.g., via three axis motion sensors, including accelerometer, gyroscope and/or compass). The captured hand movement can be used for gesture recognition (e.g., by a processing unit inside the remote control device).

A set of gesture commands can be assigned to represent control functions for the electronic device. For example, in the case of a television as the electronic device, a circle gesture can bring up the TV menu, an "x" gesture can turn the TV off, a rolling action can turn the volume up or down, a ">>" gesture can make the TV fast forward, a "||" gesture can pause the play, and so on. The gesture command definition can change based on the display mode. For example when the TV menu is displayed on the screen, the up and down pitch movement can scroll the menu. If the TV is playing a movie, the same up and down pitch movement can be interpreted as the "||" gesture, which pauses the play. A user can also assign a set of handwritten numbers and/or letters as shortcuts. For example, a user can assign the writing of a "C" as an instruction to change the channel to CNN.

The captured hand movement can also be interpreted as a cursor movement, in other words, the pointing mode. The cursor movement can be used to input search text on am on-screen keyboard, or select a menu item, for example. The interpretation of the captured hand movement (either the "gesture" mode or the "pointing" mode) can be based on the display mode, or based on an explicitly defined "mode switch" gesture. A "mode switch" gesture can be a double yaw shake, a double tap, or any other gesture that is easily recognized, but hard to be interpreted as another gesture in the existing command set.

The button on the remote control can be replaced by a capacitive sensor and/or a pressure sensor (e.g., the remote control can include no buttons on the surface, and the surface can be soft and able to be squeezed so that when the remote control is squeezed, the gesture command button is considered pressed). This can allow the remote control device to distinguish not only whether the button is pressed, but also how hard the button is pressed. The extra resolution of button press strength can be used, for example, to control the sensitivity of the motion sensors, the moving speed of the cursor, the connecting movement between multiple strokes, and the like. The remote control can also include a microphone, so that the user can input a voice command.

Figure 12:
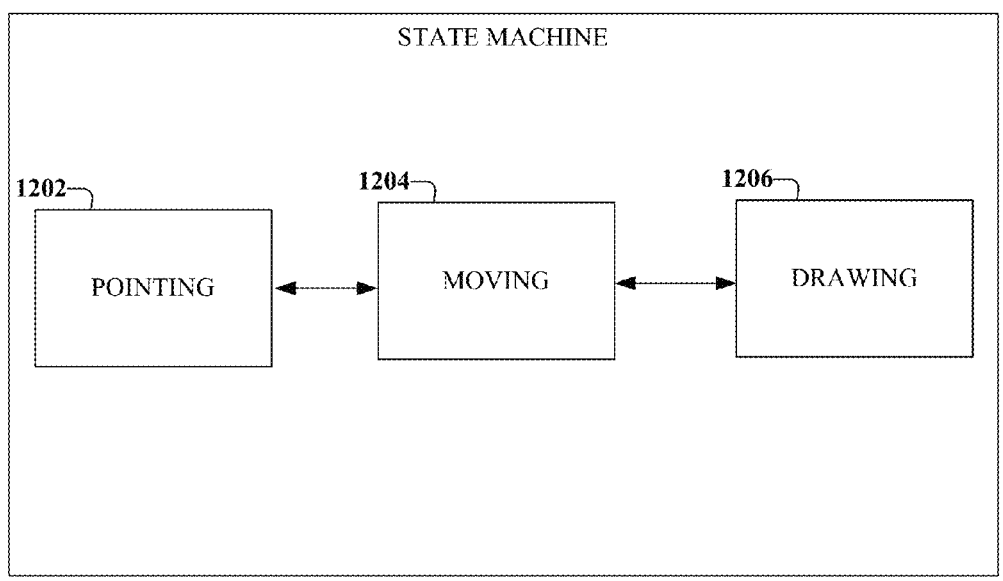
FIG. 12 is a schematic system block diagram of an embodiment of a state machine.

Referring now to FIG. 12, illustrated is a system block diagram of a state machine 1200. FIG. 12 shows an exemplary embodiment of a mouse cursor display state machine. According to an embodiment, the state machine 1200 can have three modes that can indicate a state of a mouse cursor. The modes can include pointing 1202, moving 1204, and drawing 1206.

During the pointing 1202 state, a cursor is locked at a certain position. In the pointing 1202 state, hand jitter and other artifacts can be eliminated from the motion. The motion can be detected and the hand jitter avoided by a filtering technique. A center line can be calculated through a low pass filter. A moving window can be calculated based on the center line. A peak value can be captured during the moving window to serve as an adaptive threshold. If the grid is moved outside the threshold, the state can change from the pointing 1202 state to the moving 1204 state.

The moving 1204 state is a free running linear (one to one) mode in which the cursor movement is directly based on a hand motion. If a button is pushed, for example for a certain time (e.g., 0.2 seconds), the state can transition to the drawing 1206 state. In the drawing 1206 state, the grid trajectory can be linearly mapped to the cursor display. The button release can be predicted and the distortion by the button release can be avoided.

Figure 13:
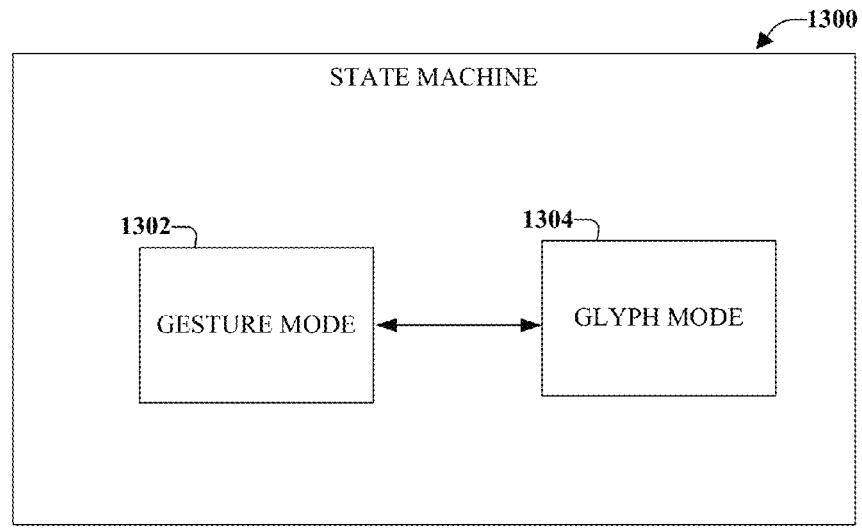
FIG. 13 is a schematic system block diagram of an embodiment of a state machine.

In addition to the state of the mouse cursor, the state machine can also include two system modes. Referring now to FIG. 13, illustrated is a system block diagram of an embodiment of a state machine 1300 including the system modes.

For example, the system modes can include a gesture mode 1302 and a glyph mode 1304. In the gesture mode 1302, the cursor can be frozen and different gesture commands control different aspects of the system. For example, in the gesture mode 1302, three different gesture commands can each be associated with a distinct gesture.

In the glyph mode 1304, the cursor can move along with the remote controller device. The trajectory can be recorded in memory and decoded. For example, the glyph mode 1304 can apply to a hand written character. When the gesture indicating a handwritten character is saved in memory, the handwritten character can be decoded.

Figure 14:
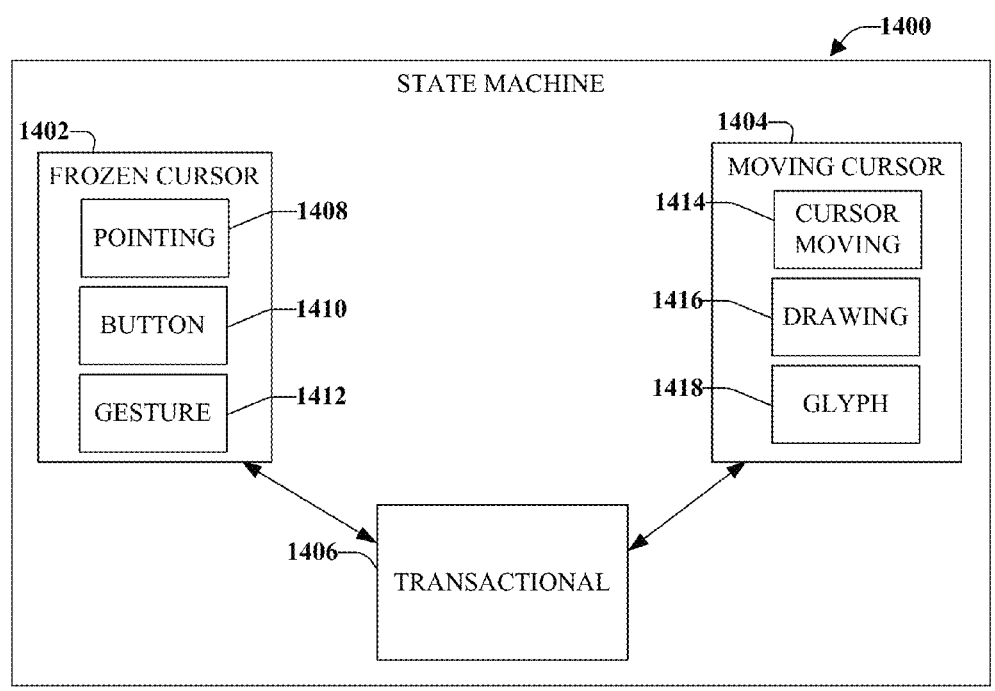
FIG. 14 is a schematic system block diagram of an embodiment of a state machine.

Referring now to FIG. 14, illustrated is an embodiment of a state machine 1400. For example, the state machine 1400 can be a pointer algorithm state machine. The algorithm includes a program (e.g., logic) that is executable by a processor. A benefit of a state machine is to decompose complex logic into a set of manageable sub-logic.

The state machine 1400 can be decompressed into three sections: a frozen cursor section 1402, a moving cursor section 1404, and a transactional section 1406. Upon initial start up, the state machine can initialize in an initial state (not shown) that can detect either the cursor moving or the cursor not moving. The initial state can be a state for both starting and finishing a state for the pointer algorithm. For example, the initial power-on can make the state machine run from the initial state. Any sequence of the pointer algorithm can finish in the initial state.

The frozen cursor section 1402 is a state where the cursor is not moving. The frozen cursor section 1402 can include a pointing state 1408, a button click handling state 1410, and a gesture state 1412. In the frozen cursor section 1402, the cursor is frozen in place and any detected hand jitter is rejected and/or eliminated.

The moving cursor section 1404 is a state where the cursor is moving. The moving cursor section 1404 can include a cursor moving state 1414, a drawing state 1416 and a glyph state 1418. In the moving cursor section 1404, the cursor directly follows the hand motion, so hand jitter need not be eliminated. The transactional state 1406 can manage a transition from the moving section 1404 to the frozen cursor section 1402.

Figure 15:
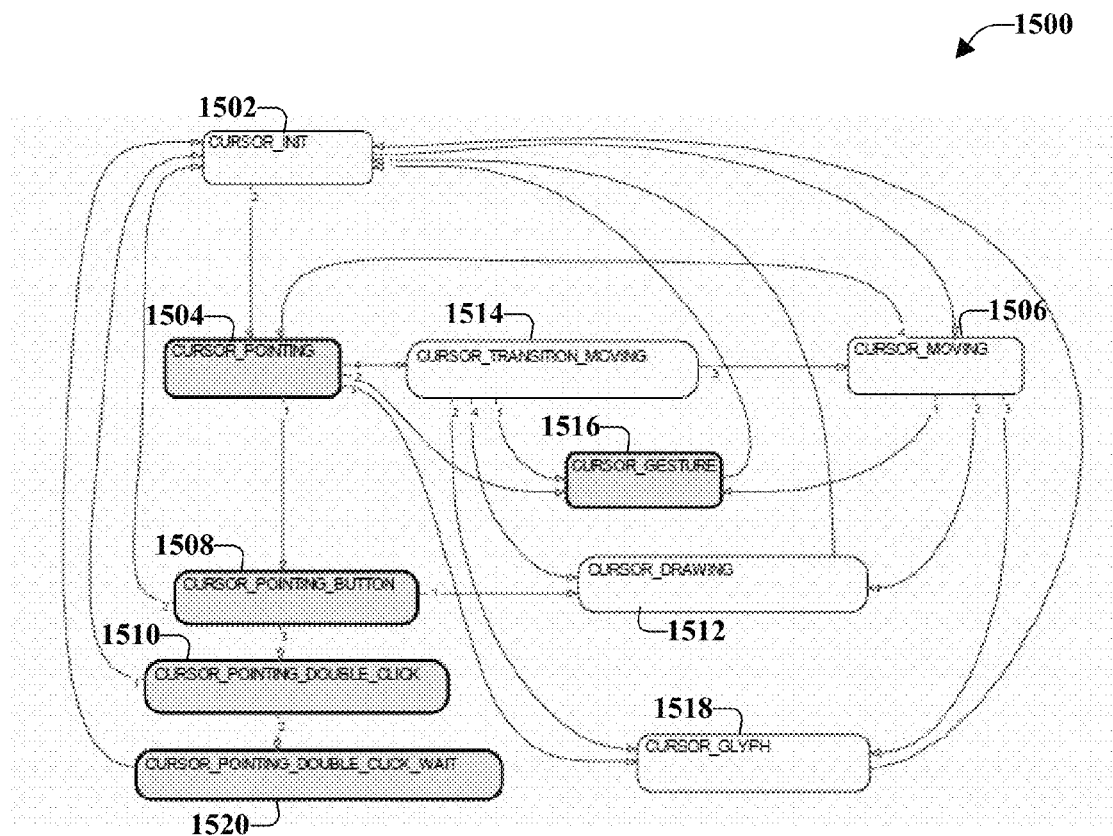
FIG. 15 is an exemplary state diagram utilized by an embodiment of a state machine.

Referring now to FIG. 15, illustrated is a simplified state transition diagram 1500 that can be implemented by an embodiment of a state machine. Elements 1504, 1508, 1516 and 1520 are highlighted illustrating that the cursor is frozen in the highlighted states so that user hand jitter and other artifacts can be rejected. In the other (non-highlighted) states, the cursor can follow the user hand movement. An advantage of the state transition architecture is a decomposition of complex logic into a set of manageable sub-logic. FIGS. 16-19 illustrate state transition diagrams 1600-1900 for sub-logic related to the complex logic illustrated in FIG. 15.

Figure 16:
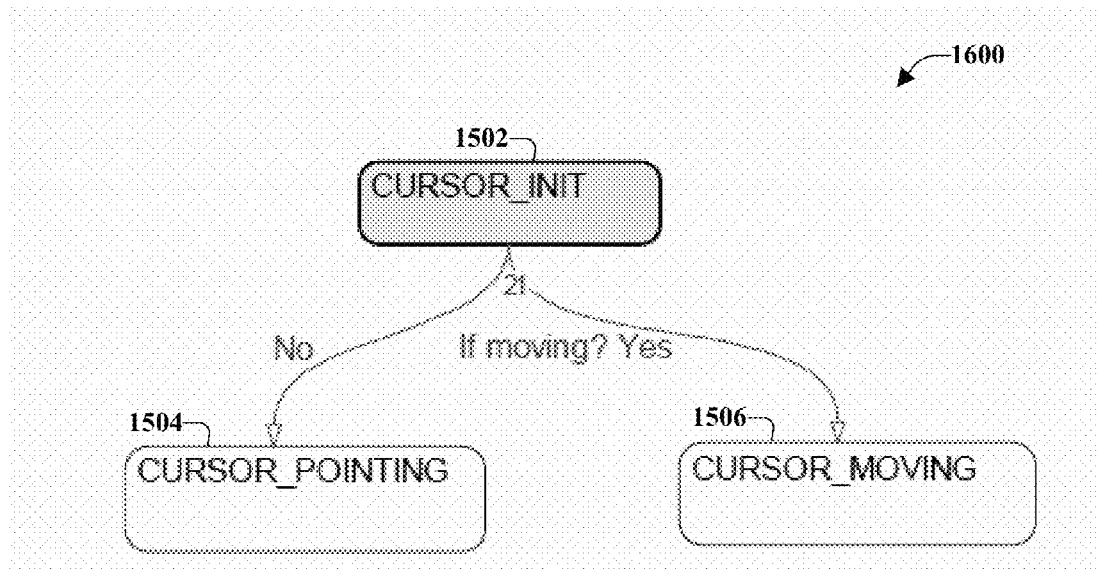
FIGS. 16-19 are exemplary state transition diagrams as part of the state diagram illustrated in FIG. 15.

Referring to FIG. 16, illustrated is a state transition diagram 1600 for the CURSOR_INIT 1502 state. The pointer algorithm both starts and finishes with the CURSOR_INIT 1502 state. For example, the state machine can run from the CURSOR_INIT 1502 at an initial power on. Additionally, for example, CURSOR_INIT 1502 is the end state for any other sequence. There are two branches from CURSOR_INIT 1502: CURSOR_POINTING 1502 and CURSOR_MOVING 1506.

The state machine can enter the CURSOR_MOVING 1506 state when the hand motion is detected. The state machine can enter the CURSOR_POINTING 1504 state when hand motion is not detected.

In the CURSOR_POINTING 1504 state, a user intention has been determined as pointing to a target icon. The cursor is frozen, which allows for the elimination of hand jitter. Accordingly, any hand motion subsequent is regarded as jitter as long as there is no constant direction for the hand motion. Accordingly, if hand motion in a constant direction is detected, the state machine transitions to the CURSOR_MOVING 1506 state.

Figure 17:
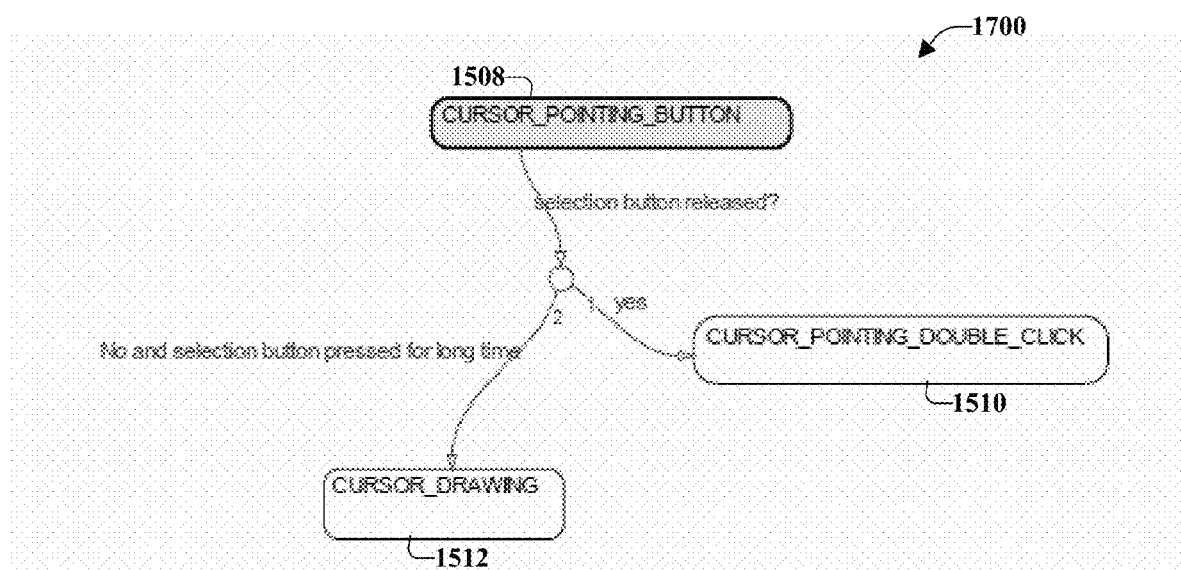

Referring now to FIG. 17, illustrated is a state transition diagram 1700 for the CURSOR_POINTING_BUTTON 1508 state. The state machine is driven to enter the CURSOR_POINTING_BUTTON 1508 state when a selection button is pressed. If the selection button is released, the state can transition to the CURSOR_POINTING_DOUBLE_CLICK 1510 state to be ready to receive another selection button click. If the selection button is not released within a certain time window, the user intent is detected as drawing. The state is transitioned to CURSOR_DRAWING 1512.

With regard to CURSOR_POINTING_DOUBLE_CLICK, if the time threshold is passed and no second button press has occurred, the click is complete, and the state is transitioned to CURSOR_INIT 1502. If a second button click occurs before the time threshold, the double click process continues. They state is transitioned to CURSOR_POINTING_DOUBLE_CLICK_WAIT 1520 to wait for the button release. The presence of the second click can drive the state machine to the CURSOR_POINTING_DOUBLE_CLICK_WAIT 1520 state. The release of the button is expected in this state to complete the double click sequence. After the button is released, the state is transitioned to CURSOR_INIT 1502.

Figure 18:
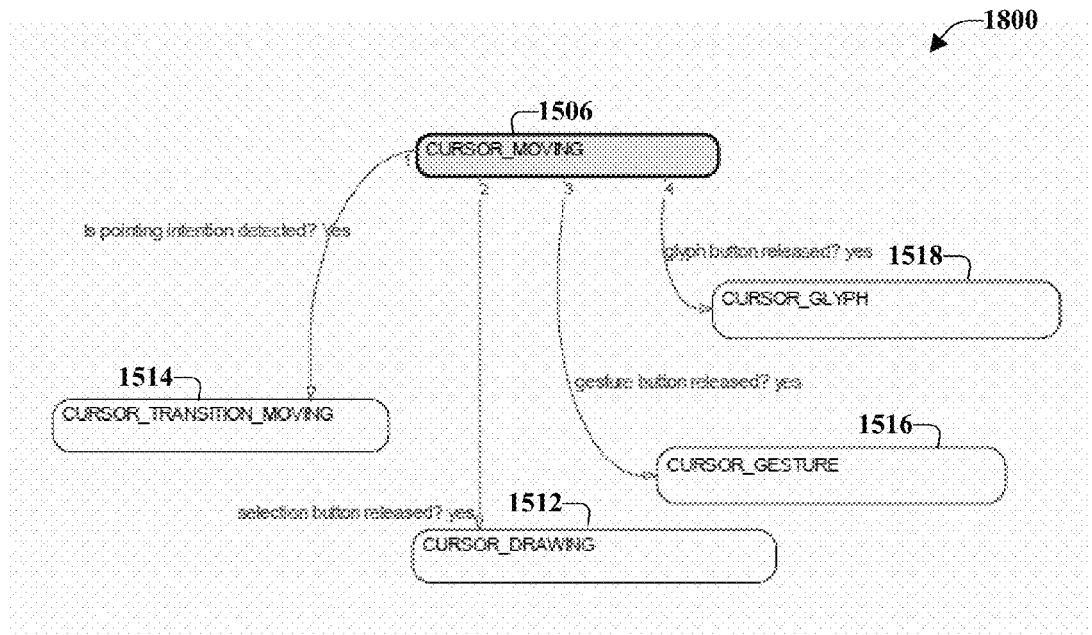

Referring now to FIG. 18, illustrated is a state transition diagram 1800 for the CURSOR_MOVING 1506 state. When a user intention is determined as moving the cursor in a consistent direction, the state machine can be driven to the CURSOR_MOVING 1506 state. In the CORSOR_MOVING 1506 mode, the cursor can track the hand movement on a one to one basis.

If no motion is detected, the state can be transitioned to CURSOR_TRANSITION_MOVING 1514, which is ready to freeze the cursor. If a drawing action, a gesture action or a glyph action is detected, for example through a corresponding button, the state can be transitioned to a respective state 1512, 1516, or 1518.

The state machine can enter the CURSOR_DRAWING 1512 state upon detection of a drawing action (e.g., a drawing button press). The CURSOR_DRAWING 1512 state handles the drawing function, for example, with regard to a painting program, a Chinese hand writing software or the like. After a button release is detected, the drawing process is completed. The state can transition to CURSOR_INIT 1502.

The state machine can enter the CURSOR_GESTURE 1516 state upon detection of a gesture action (e.g., a gesture button press). After a button release is detected, the gesture process can be completed and the state can be transitioned to CURSOR_INIT 1502.

The state machine can enter the CURSOR_GLYPH 1518 state upon detection of a glyph action (e.g., a glyph button press). After a button release is detected, the glyph process can be completed and the state can be transitioned to CURSOR_INIT 1502.

Figure 19:
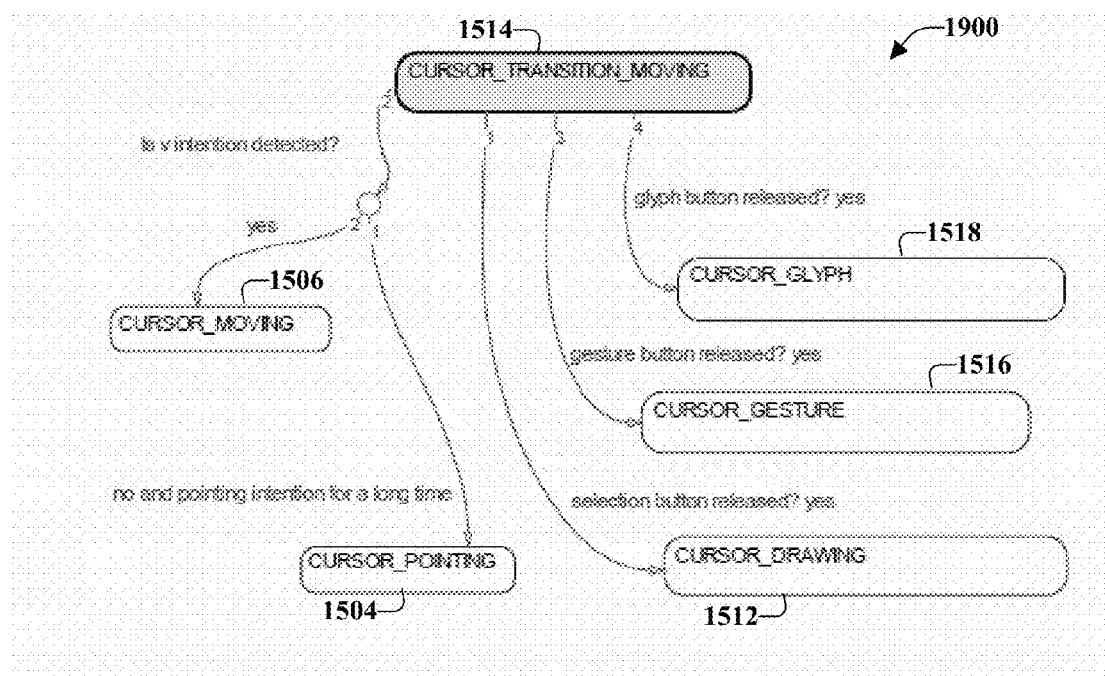

Referring now to FIG. 19, illustrated is a state transition diagram 1900 for the CURSOR_TRANSITION_MOVING 1514 state. The CURSOR_TRANSITION_MOVING 1514 state is a transition state from cursor moving to cursor pointing. When a user intent is detected as pointing to a target icon, the state machine needs additional time to conform this detection. After the confirmation and/or approval of the user intent, the state machine can be transitioned to the CURSOR_POINTING 1502 state.

Figure 20:
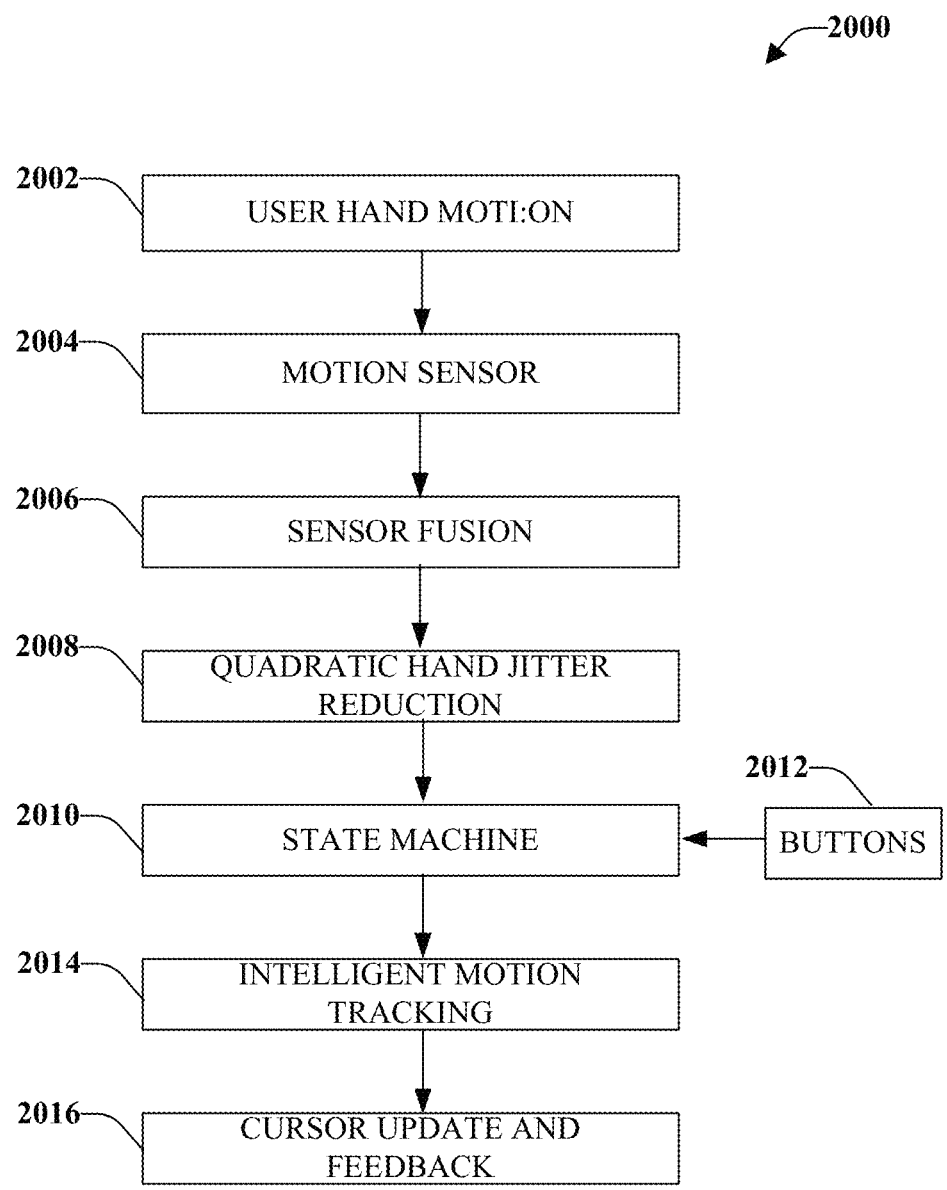
FIG. 20 is an exemplary illustration of a signal processing data flow in an embodiment of an intelligent remote control algorithm.

Referring now to FIG. 20, illustrated is a schematic system block diagram of an example motion processing function 2000 for a remote controlling device. At element 2002, a user can make a hand motion, which is detected by one or more motion sensors at element 2004. Data from the sensors is sent to a processing unit where rotational movement is calculated and transformed into three cursor location coordinates 2006, while hand jitter is removed 2008. A state machine 2010 can transition into different states, for example, based on an input from one of several buttons 2012 on the remote controlling device. When the user pushes the buttons, some unwanted hand motion will be induced, which will disturb the cursor on the screen. In order to remove the unwanted motions, an intelligent state machine is utilized that can engage in intelligent motion tracking 2014 and feedback 2016.

While the various embodiments have been described in connection with the various figures, it is to be understood that other similar embodiments may be used or modifications and additions may be made to the described embodiment for performing the same function without deviating therefrom. Therefore, the present innovation should not be limited to any single embodiment, but rather should be construed in breadth and scope in accordance with the appended claims.

What is claimed is:

1. A handheld remote control device, comprising:
    at least one three axis gyroscope that senses a rotational movement of the handheld remote control device and provides a first measurement output in response to an occurrence of a first input condition;
    at least one three axis accelerometer that senses gravity and linear movement of the handheld remote control device and provides a second measurement output in response to the occurrence of the first input condition; and
    a processing unit that uses the first and second measurement outputs to generate information associated with cursor location; wherein,
    the at least one three axis accelerometer, the at least one three axis gyroscope and the processing unit are integrated in a single integrated circuit chip; wherein the processing unit calculates a three dimensional orientation corresponding to a hand motion with a high accuracy.

2. The handheld remote control device of claim 1, wherein the handheld remote control device includes a mobile phone.

3. The handheld remote control device of claim 2, wherein the first input indicates that a user has picked up the mobile phone.

4. The handheld remote control device of claim 1, further comprising: the processing unit uses the first and second measurement outputs to perform gesture recognition when a user picks up the handheld remote control device.

5. The handheld remote control device of claim 1, further comprising: one of a pressure sensor, a push button, a soft button, a microphone or a capacitive sensor that detects the occurrence of the first input condition.

6. The handheld remote control device of claim 1, further comprising: a compass providing a third measurement output in response to the occurrence of the first input condition.

7. The handheld remote control device of claim 1, wherein the at least one gyroscope includes three gyroscopes that provide three dimensional angular motion.

8. The handheld remote control device of claim 1, wherein the at least one accelerometer provides three dimensional linear motion measurements.

9. The handheld remote control device of claim 1, further comprising: a radio frequency (RF) unit configured to transmit the information.

10. The handheld remote control device of claim 9, wherein the RF module is encompassed in the integrated circuit chip.

11. The handheld remote control device of claim 1, further comprising: a transmitter that transmits the information to outside the handheld remote control device by a using wireless protocol.

12. The handheld remote control device of claim 11, wherein the wireless protocol includes one of WiFi, Bluetooth, or Radio Frequency for Consumer Electronics.

13. The handheld remote control device of claim 1, wherein the device operates in at least two modes of functionality, wherein
- a mode of the two modes includes a tracking mode wherein the information associated with the cursor location directly tracks the first and second measurement outputs, and
- a mode of the two modes includes a non-linear mode wherein the processor generates the information associated with the cursor location by removing noise related to a user's hand jitter.

14. The handheld remote control device of claim 13, further comprising: an intelligent component that switches between the at least two modes of functionality.

15. The handheld remote control device of claim 13, further comprising: the processor that switches between the at least two modes of functionality in response to occurrence of a second input condition.

16. The handheld remote control device of claim 15, wherein the occurrence of the second input condition includes one of a user making a gesture in air while holding the device, tapping the device, shaking the device, drawing a handwriting symbol in air while holding the device or drawing a handwriting character in air while holding the device.

17. The handheld remote control device of claim 15, further comprising: the processor that changes a shape of a cursor in response to an occurrence of the second input condition.

18. The handheld remote control device of claim 15, further comprising: the processor that initiates an operational control of the handheld remote control device in response to an occurrence of the second input condition.

19. A method, comprising:
- detecting a motion of a handheld remote control device by using a three-axes gyroscope that senses orientation in three dimensions and a three-axes accelerometer that senses gravity and linear motion in three dimensions integrated in a single integrated circuit chip;
- determining a action associated with the motion by using a processor that is integrated in the integrated circuit chip; wherein the processor calculates a three dimensional orientation corresponding to a hand motion with a high accuracy;
- selecting an operating mode of the processor based on the determination; and
- generating information about cursor location by tracking the motion; wherein the information about the cursor location is two dimensional information.

20. The method of claim 19, wherein the selecting includes selecting a linear mode upon determining that the motion includes the motion of the device in a constant direction.

21. The system, comprising:
- a display;
- a handheld remote control device remotely coupled to the display;
- at least one gyroscope that senses a rotational movement of the handheld remote control device and provides a first measurement output in response to an occurrence of a first input condition;
- at least one accelerometer that senses gravity and linear movement of the handheld remote control device and provides a second measurement output in response to the occurrence of the first input condition; and
- a processing unit that uses the first and second measurement outputs to generate information associated with cursor location; wherein,
- the at least one accelerometer, the at least one gyroscope and the processing unit are integrated in a single integrated circuit chip; wherein the processing unit calculates a three dimensional orientation corresponding to a hand motion with a high accuracy; and
- the display displays the cursor based on the information.

22. The system of claim 21, wherein the information identifies the pixel grid location at which the cursor is to be located on the display.

* * * * *